Figure 1B:
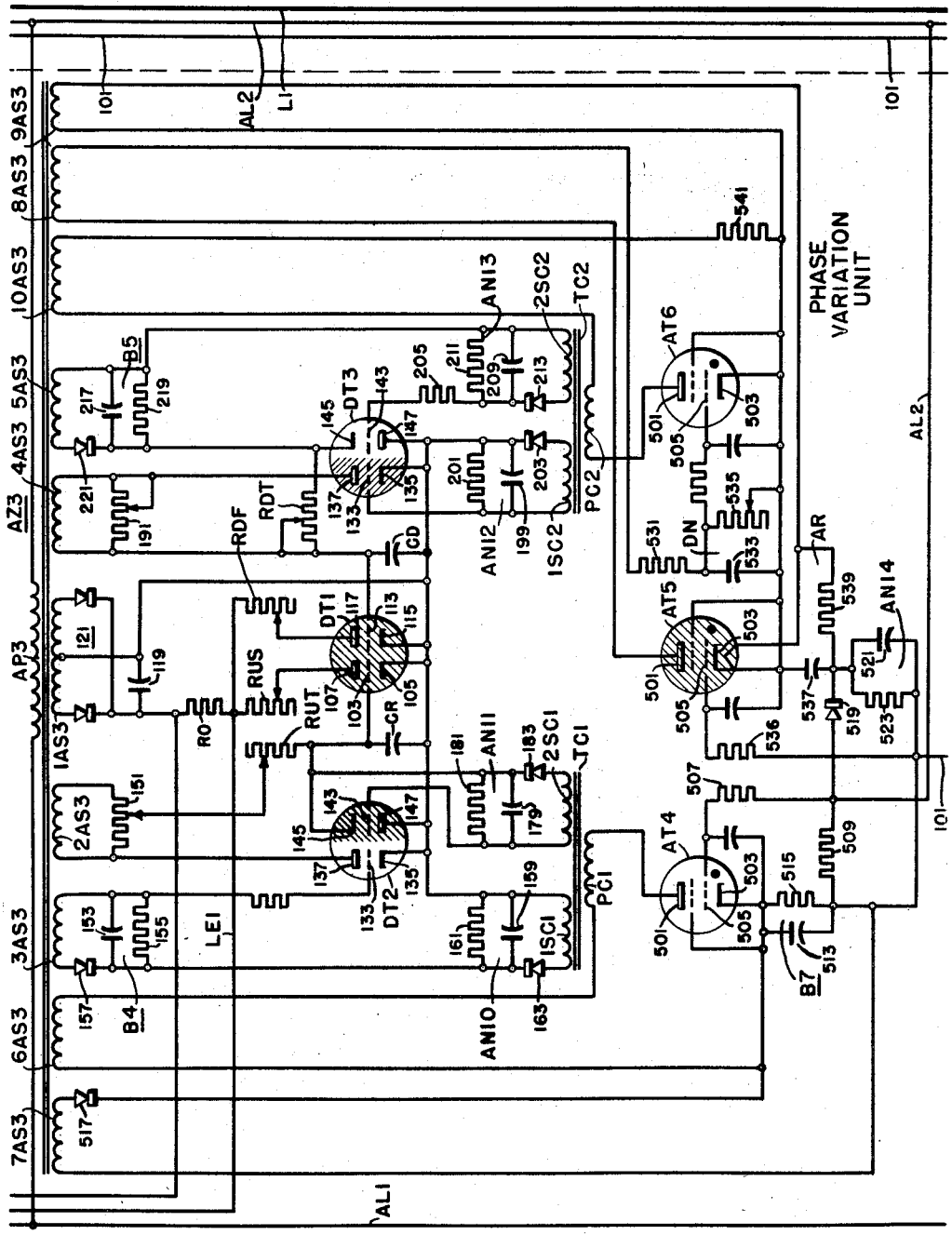

Aug. 26, 1958
W. E. LARGE
2,849,608
CONTROL FOR RESISTANCE WELDING
Filed Sept. 23, 1953
3 Sheets-Sheet 1
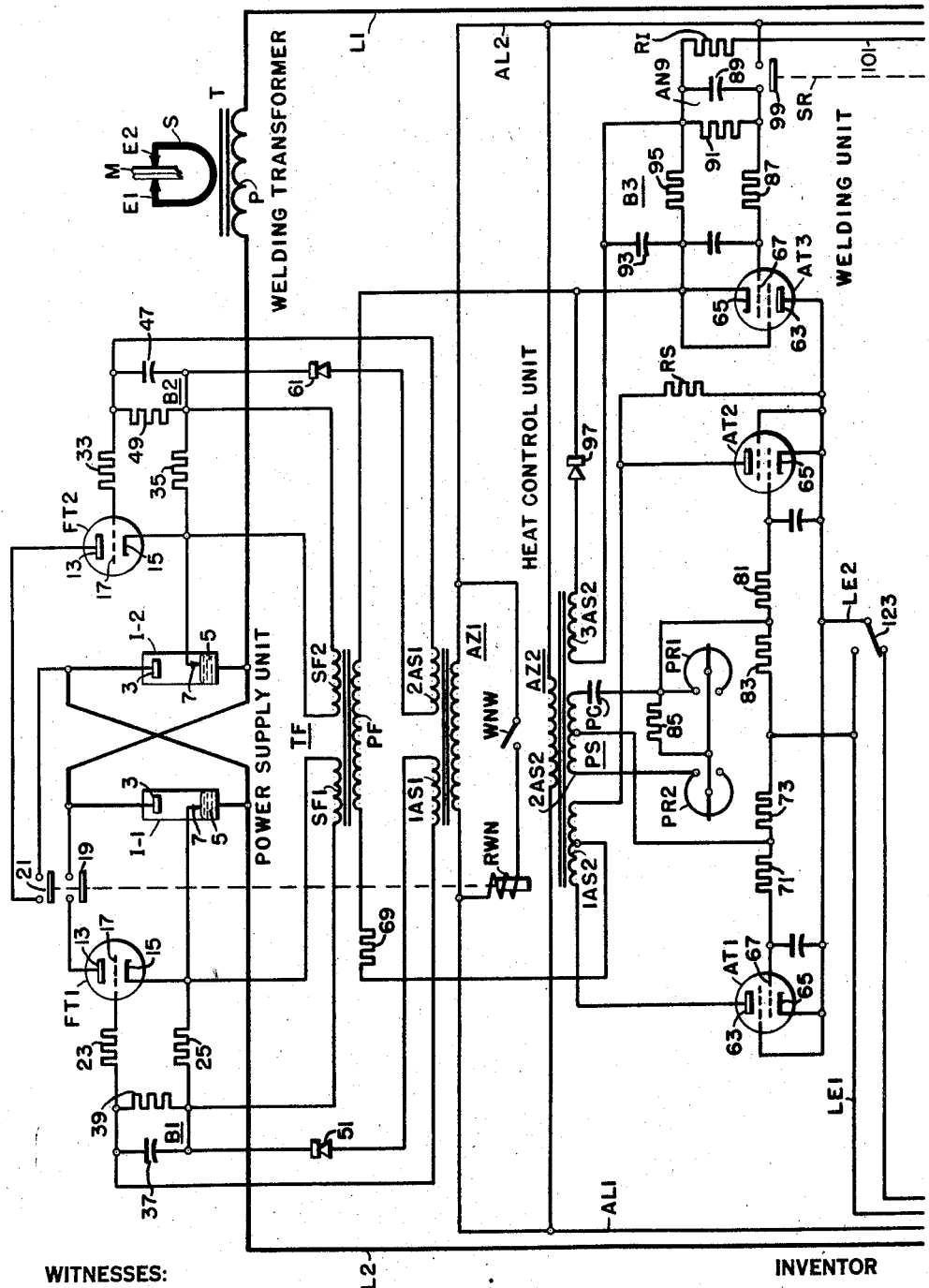
Fig. IA.
WITNESSES:
John E. Heasley
Leon J. Taza
INVENTOR
William E. Large.
BY
[signature]
ATTORNEY INVENTOR
William E. Large.
BY
ATTORNEY Aug. 26, 1958  W. E. LARGE  2,849,608
CONTROL FOR RESISTANCE WELDING
Filed Sept. 23, 1953  3 Sheets-Sheet 3

WITNESSES:
Robert C. Baird
Leon J. Vaga

INVENTOR
William E. Large
BY
Hyman Diamond
ATTORNEY

000# United States Patent Office 2,849,608
Patented Aug. 26, 1958

2,849,608

CONTROL FOR RESISTANCE WELDING

William E. Large, Lancaster, N. Y., assignor to Westinghouse Electric Corporation, East Pittsburgh, Pa., a corporation of Pennsylvania Application September 23, 1953, Serial No. 381,936

8 Claims. (Cl. 250—27)

My invention relates to electric discharge apparatus and has particular relation to apparatus for controlling the supply of current for welding.

In electric resistance welding, particularly where precision in the supply of welding current is required, it has become the practice to supply the welding current to the material being welded in discrete pulses, each a few periods of commercial frequency in duration, or in trains or groups of such pulses. In the welding of the lighter metals, such as aluminum and magnesium and their alloys and at times in the welding of other metals, these pulses are of composite makeup, having a rise component, a weld component and a decay component, and it is desirable that these components be set precisely. In setting the rise component of the welding current pulse, the wave form of, and the time taken by, the pulses in rising to the welding magnitude is determined. These properties of the rise component in turn determine how the material to be welded is preheated before welding, and the interval during which the rise component is produced is usually called the "preheat" interval. In setting, the decay component, the wave form of, and the time taken by the pulse in falling from the weld magnitude to zero, is determined. These properties of the component determine how the material to be welded is annealed and the time interval during which the welding current decays from the welding magnitude to zero is usually called the "postheat," or the "anneal" interval. The component of the welding current between the preheat and the postheat components is called the "weld" component and the wave form and duration of this component is set to produce the necessary fusing of the material being welded without any accompanying burning or other deterioration.

To achieve the desired flexibility for welding wide varieties of different metals and their alloys of widely different dimensions and shapes, it is desirable that welding apparatus include facilities for impressing welding pulses having preheat, weld and postheat components which may be varied over a wide range. It is also desirable that facilities be provided for eliminating either or both the preheat and the postheat components.

In precision welding apparatus the welding current is supplied through electric discharge devices, such as ignitrons or thyratrons, and the preheat, weld and postheat components of welding pulses are derived by setting the control circuits for the electric discharge devices so that the latter fire, or become conducting, at predetermined instants in the periods of the supply. That is, during the preheat interval the discharge devices are set to fire late in the periods of the supply, during the weld interval, they are set to fire early in the periods of the supply, and during the postheat they are again set to fire late in the periods of the supply. The settings of the phase angle at which the discharge devices are fired are usually called the "heat control settings." In apparatus in accordance with the teachings of the prior art of which I am aware, the heat control circuits are provided with phase determining networks which are preset for preheat, postheat and weld, and with mechanical relays which are operated in the desired sequence during each welding impulse to produce the desired characteristics for the welding pulse. In using such apparatus, I have found that it is not entirely satisfactory. The principal deficiency of this apparatus is that it does not lend itself to achieving the precision which is demanded of the welding pulse. In addition, this apparatus is costly because it requires a number of relays and phase setting components and it does not have the flexibility which is desirable for welders which are to weld materials having properties that vary over a wide range.

It is accordingly an object of my invention to provide apparatus which shall operate with high precision for controlling the supply of welding current pulses of the type having preheat, postheat and weld components.

Another object of my invention is to provide relatively low-cost apparatus for electric resistance welding which shall include facilities for producing welding pulse having precise preheat, weld and postheat components.

A further object of my invention is to provide highly flexible but precise welding apparatus for supplying welding current pulses having preheat, weld and postheat components.

A more specific object of my invention is to provide apparatus having a minimum of mechanical relays for controlling the supply of welding current to a welding transformer, which apparatus shall have facilities for delivering welding pulses having preheat, weld and postheat components.

An incidental object of my invention is to provide novel electronic circuits which, among their other uses, are particularly suitable for use in a control system of the above-described type.

My invention arises from the realization that the lack of precision in the prior art welding apparatus is caused by the uncertainties of the operation of the magnetic relays. In producing a welding pulse having preheat, weld and postheat components, a relay operates to effect the conversion from preheat to weld and another relay operates to effect the conversion from weld to postheat. Each of these relays consumes a substantial time interval, which is different for different relays, in operating and during this time interval the current flowing to the welding transformer varies in an uncertain manner. This variation reduces the precision of the apparatus.

In accordance with my invention, I provide a phase variation unit for an electric resistance welder which is free of mechanical relays. This unit supplies a potential to the heat control unit which varies the phase setting of the latter unit. This potential is varied in the desired manner to obtain the desired components for the welding pulse by charging and discharging, as required, a pair of capacitors, one of which determines the preheat component of the welding pulse and the other the postheat component. The capacitors are charged and discharged through a plurality of electric discharge devices which are rendered conducting and non-conducting in the desired sequence.

Figure 1C:
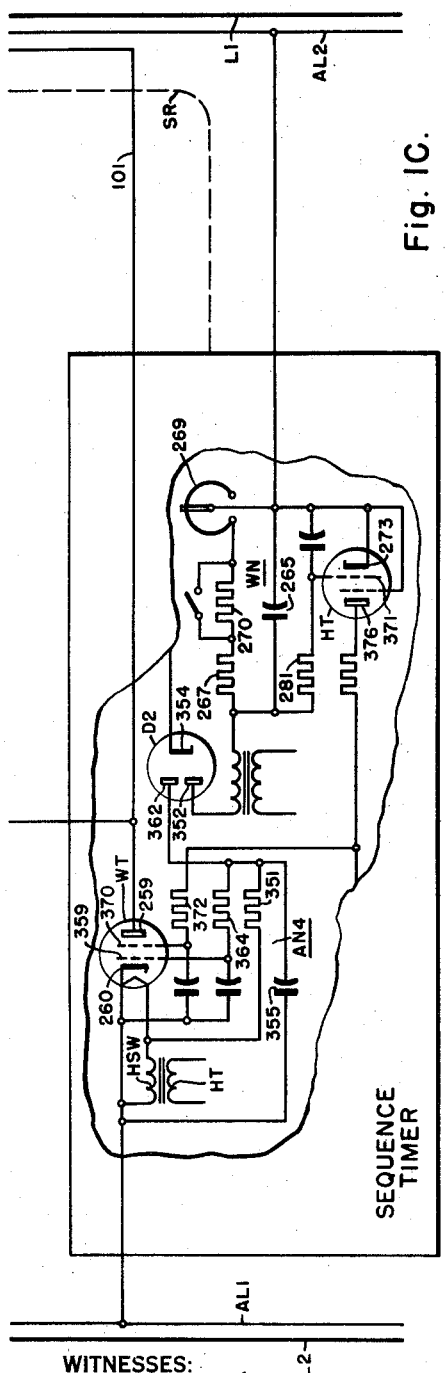
Figure 2:
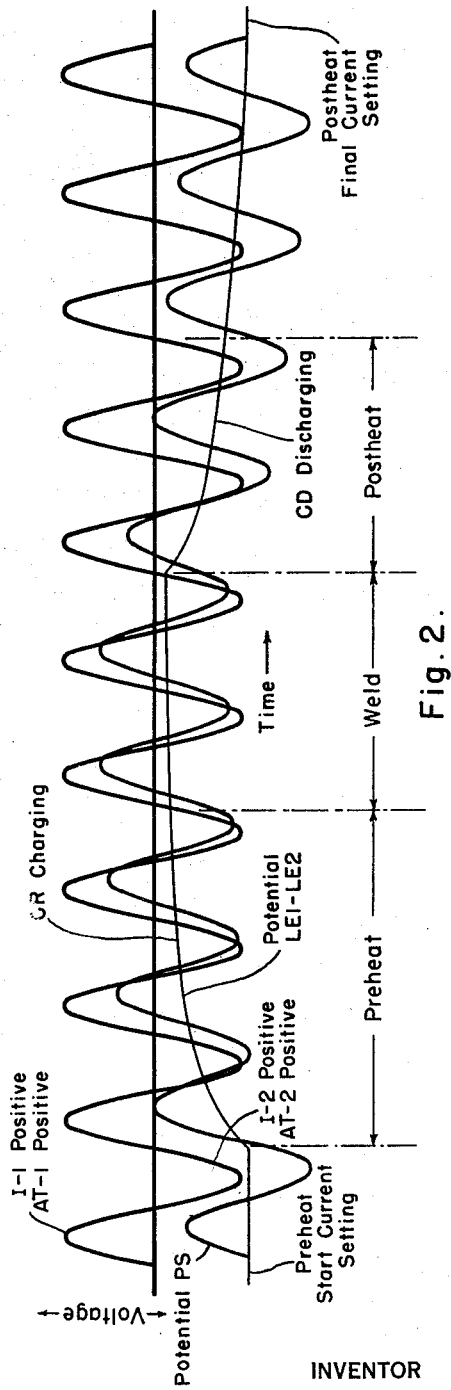

The novel features that I consider characteristic of my invention are set forth generally above. The invention itself, however, both as to its organization and its method of operation, together with the additional objects and advantages thereof will be understood from the following description of a specific embodiment when read in connection with the accompanying drawings, in which:

Figures 1A, 1B and 1C constitute a circuit diagram of a preferred embodiment of my invention; and Fig. 2 is a graph illustrating the operation of Figs. 1A, 1B and 1C.

Description

The apparatus shown in Figs. 1A, 1B and 1C includes a welding unit, a phase variation unit and a sequence timer. These units are supplied from buses or conductors L1 and L2 which derive their power from the usual commercial supply ordinarily operating at a frequency of 50 or 60 cycles. The auxiliary components of this apparatus are further supplied from buses or conductors AL1 and AL2 which derive their power from the main conductors L1 and L2 through a transformer (not shown).

In the use of the apparatus, the sequence timer delivers a signal usually in the form of a series of pulses of current each of duration equal to a half period of the supply during the interval during which the welding is to take place. This signal is impressed on the welding unit to condition it to supply welding current and also on the phase variation unit. The phase variation unit also transmits a signal to the welding unit which causes the latter, when it is conditioned as mentioned above, to transmit current of a magnitude corresponding to the signals delivered by the phase variation unit. The latter signals are timed to produce a welding pulse or pulses having the desired preheat, weld and postheat components.

The welding unit includes a welding transformer T, a power supply unit and a heat control unit. The welding transformer T is of the usual structure having a primary P with a number of turns or a number of groups of turns and a secondary S usually with fewer turns or groups of turns than the primary. The work M is interposed between electrodes E1 and E2 connected to the terminals of the secondary S.

The power supply unit includes a pair of ignitrons I-1 and I-2 each having an anode 3, a cathode 5 and an igniter 7. The anodes 3 and the cathodes 5 of the ignitrons I-1 and I-2 are connected in antiparallel and the primary P is connected in series with the ignitrons between the conductors L1 and L2.

Firing thyratrons FT1 and FT2 are associated with each of the ignitrons I-1 and I-2. Each firing thyratron has an anode 13, a cathode 15 and a control electrode 17. The anode 13 of each thyratron FT1 and FT2 is connected to the anode 3 of the associated ignitrons I-1 and I-2 through contacts 19 and 21 of a weld-no-weld relay RWN; the cathode 15 of each is connected to the igniter 7 of the associated ignitron.

The control electrode 17 of the thyratron FT1 is connected through a grid resistor 23, a bias B1 and another resistor 25 to its cathode 15. The control electrode 17 of thyratron FT2 is similarly connected through a grid resistor 33, a bias B2 and another resistor 35 to its cathode. The biases B1 and B2 each consists of a capacitor 37 and 47 shunted by a resistor 39 and 49 which are supplied from the secondaries 1AS1 and 2AS1 of a transformer AZ1 supplied from the conductors AL1 and AL2 through rectifiers 51 and 61 which may be of the dry type. The biases B1 and B2 are of such polarity and magnitude as to prevent the conduction of the thyratrons FT1 and FT2 in the standby condition of the apparatus. The bias may be counteracted by potential impressed across the resistors from secondaries SF1 and SF2 of a transformer TF, the primary PF of which is supplied from the heat control unit.

The heat control unit includes thyratrons AT1, AT2, and AT3. Each of these thyratrons has an anode 63, a cathode 65 and a control electrode 67. The anodes 63 and cathodes 65 of the thyratrons are supplied from the secondary 1AS2 of a transformer AZ2 which derives its power from the conductors AL1 and AL2. The secondary 1AS2 has a pair of terminal taps and an intermediate tap. One of the terminal taps is connected to the anode 63 of thyratron AT1 and the other to the anode 63 of thyratron AT2. The intermediate tap is connected through a resistor 69 to one terminal of the primary PF. The cathodes 65 of thyratrons AT1 and AT2 are connected together and to the anode 63 of thyratron AT3. The cathode of thyratron AT3 is connected to the other terminal of the primary PF. The thyratrons AT1 and AT2 are thus each connected in series with the thyratron AT3 through the primary PF across the power supply delivered by the sections of the secondary 1AS2.

A resistor RS is connected in parallel with the thyratron AT2. This resistor RS serves to balance the anode-cathode voltages on thyratrons AT1 and AT2 so that they are equal.

The control electrode 67 of the thyratron AT1 is connected through a grid resistor 71 and another resistor 73 to a conductor LE1 which is energized from the phase variation unit. The control electrode of the thyratron AT2 is similarly connected through a grid resistor 81 and another resistor 83 to the conductor LE1. The conductor LE2 energized from the phase variation unit is connected to the cathodes 65 of thyratrons AT1 and AT2. Thus, the phase variation unit impresses a common potential between the control electrodes 67 and the cathodes 65 of the thyratrons AT1 and AT2.

A phase shift network PS is connected across the resistors 73 and 83 in the control circuits of the thyratrons AT1 and AT2. This phase shift network includes another secondary 2AS2 of the transformer AZ2 which also has a pair of terminal taps and an intermediate tap. Across the terminal taps a capacitor PC in series with a pair of variable resistors PR1 and PR2 are connected. One of the variable resistors PR1 is shunted by a fixed resistor 85. The intermediate tap of the secondary 2AS2 is connected to the junction of the grid resistor 71 and the other resistor 73 in the control circuit of thyratron AT1; the junction of the capacitor PC and the resistor PR1 is connected to the junction of the grid resistor 81 and the other resistor 83 in the control circuit of thyratron AT2. Potentials of opposite phase and of phase relationship, to the potential delivered by the conductors AL1 and AL2, depending on the setting of the resistors PR1 and PR2, are thus impressed across the respective resistors 73 and 83 in the control circuits of the thyratrons AT1 and AT2. On these potentials, the potential delivered by the conductors LE1 and LE2 is superimposed.

The control electrode 67 of the thyratron AT3 is connected to its cathode 65 through a grid resistor 87, a time constant network AN9 and a biasing network B3. The network AN9 includes a capacitor 89 shunted by a resistor 91; the biasing network B3 also includes a capacitor 93 shunted by a resistor 95. The latter is supplied from the secondary 3AS2 of the transformer AZ2 through a rectifier 97 and impresses a negative bias between the control electrode 67 and the cathode 65 sufficient to block the thyratron AT3 during the standby condition of the apparatus. Across the network AN9 a resistor RI may be connected through the normally open contact 99 of the starting relay SR of the sequence timer. This resistor RI is supplied from the sequence timer through a conductor 101 when the weld thyratron WT of the sequence timer is conducting. The current flow is such that the capacitor 89 of the network AN9 is charged to a potential which tends to counteract the potential of bias B3.

The phase variation unit includes a capacitor CR which serves to control the variation of the welding current during the preheat interval and a capacitor CD which serves to control the variation of the current during the postheat interval. These capacitors CR and CD are respectively connected between the control electrodes 103 and 113 and the cathodes 105 and 115 of the sections of a double triode DT1. Each section of the double triode DT1 includes in addition to the control electrodes and the cathodes, anodes 107 and 117.

The anodes 107 and 117 and cathodes 105 and 115 of the double triode DT1 are supplied from a secondary 1AS3 of a transformer AZ3, the primary AP3 of which is supplied from the conductors AL1 and AL2. The secondary 1AS3 supplies a filtering capacitor 119 through a fullwave rectifier 121. The positive plate of this capacitor 119 is connected through an output resistor RO and through a pair of variable resistors RUS and RDF to the respective anodes 107 and 117 of the sections of the double triode DT1. The cathodes 105 and 115 of the double triode DT1 are connected together to the negative plate of the capacitor 119.

The terminal of the output resistor RO connected to the positive plate of the capacitor 119 is connected to the conductor LE2 through a switch 123 with which the phase variation unit may be connected to, or disconnected from, the welding unit. The other terminal of the resistor is connected to the conductor LE1. When either or both of the sections of the double triode DT1 is conducting, a potential drop appears across the output resistor RO which is impressed (if switch 123 is in the position shown in the drawings) between the conductors LE1 and LE2. This potential drop is such that the conductor LE1 is negative with respect to the conductor LE2. Thus a negative potential depending on the extent of the conduction of the sections of the triode DT1 is impressed between the control electrodes and the cathodes of the thyratrons AT1 and AT2. The higher the current conducted by the double triode DT1, the higher this negative potential. The potential of the phase shift network PS is superimposed on this negative potential in such a sense as to tend to counteract it. This superimposed potential counteracts the negative potential from the conductors LE1 and LE2 at an instant in the half periods of the supply, depending on the magnitude of the negative potential, the higher the negative potential the later the instant. Thus the thyratrons AT1 and AT2 may be rendered conducting at instants in the half periods of the supply which depend on the conduction of the sections of triode DT1 and which are later the higher the current conducted by either or both of the sections. The magnitude of the current conducted by the sections of DT1 is dependent on the capacitors CR and CD, but for any charge on the capacitors, this magnitude is dependent on the settings of the variable resistors RUS and RDF.

The phase variation unit also includes additional double triodes DT2 and DT3. Each of these double triodes DT2 and DT3 has a pair of anodes 137 and 147, a pair of cathodes 135 and 145 and a pair of control electrodes 133 and 143. One section 137—135 of double triode DT2 is supplied from a variable resistor 151 connected across a secondary 2AS3 of the transformer AZ3. The anode 137 of this section is connected to one terminal of the variable resistor 151 and the variable tap of this resistor is connected through another variable resistor RUT to one plate of the capacitor CR. The other plate of the capacitor CR is connected to the cathode 135 of the section. The control electrode 133 of this same section is connected to the cathode 135 through a biasing network B4 and through a time constant network AN10. The biasing network B4 includes a capacitor 153 having a resistor 155 in parallel therewith. This network is supplied from a secondary 3AS3 of the transformer AZ3 through a dry rectifier 157. The network AN10 includes a capacitor 159 having a resistor 161 in parallel therewith. Across the capacitor the secondary 1SC1 of a control transformer TC1 is connected through a dry rectifier 163.

The anode 147 and cathode 145 of the other section of the double triode DT2 are connected across the capacitor CR so as to conduct in a direction opposite to the first section 137—135 of the double triode DT2. Thus, when the first section 137—135 of the double triode DT2 is conducting, the capacitor CR is charged with its upper plate negative and its lower plate positive and when the other section 147—145 is conducting, the capacitor CR is discharged.

Between the control electrode 143 and the cathode 145 of the latter section, a time constant network AN11 is connected. This network includes a capacitor 179 having a resistor 181 in parallel therewith and is supplied through a dry rectifier 183 from another secondary 2SC1 of the transformer TC1.

One section 137—135 of the double triode DT3 is supplied from a variable resistor 191 connected across another secondary 4AS3 of the transformer AZ3. The adjustable tap of this resistor 191 is connected to the anode 137 of the section and the fixed tap to the capacitor CD. The cathode 135 of the section 137—135 is connected to the capacitor CD. Between the control electrode 133 and the cathode 135 of this section, a time constant network AN12 is connected. This network includes a capacitor 199 shunted by a resistor 201. The secondary 1SC2 of a control transformer TC2 is connected across the capacitor through a dry rectifier 203. The other section 147—145 of the double diode DT3 is connected across the capacitor CD through a variable resistor RDT in such manner that it conducts a direction opposite to the first section 137—135. The capacitor CD may thus be charged through the first section 137—135 and discharged through the other section 147—145. Between the control electrode 143 and the cathode 145 of the latter section, a time constant network AN13 and a bias network B5 are connected through a grid resistor 205. The time constant network includes a capacitor 209 shunted by a resistor 211. Across the network AN13, another secondary 2SC2 of the transformer TC2 is connected through a dry rectifier 213. The bias network also includes a capacitor 217 shunted by a resistor 219. A secondary 5AS3 of the transformer AZ3 is connected across the bias network B5 through a dry rectifier 221. The bias of the network B5 is adequate to maintain the section 147—145 of the triode DT3 nonconducting in the absence of potential on network AN13.

The phase variation unit also includes three thyratrons AT4, AT5 and AT6. Each thyratron has an anode 501, a cathode 503 and a control electrode 505. Thyratron AT4 is supplied from another secondary 6AS3 of the transformer AZ3. This secondary 6AS3 is connected between the anode 501 and cathode 503 of the thyratron AT4 through the primary PC1 of the transformer TC1. The control electrode of the thyratron AT4 is connected to its cathode through a grid resistor 507, another resistor 509 and a biasing network B7. The biasing network includes a capacitor 513 shunted by a resistor 515 and is supplied from a secondary 7AS3 of the transformer AZ3 through a dry rectifier 517. The bias impressed on the network B7 is sufficient to maintain the thyratron AT4 non-conducting in the standby condition of the apparatus. The control electrode 505 of the thyratron AT4 is also connected through the grid resistor 507 to the conductor AL2. In addition, a time constant network AN14 is connected across the other resistor 509 in the control circuit of the thyratron AT4 through a rectifier 519. This network AN14 includes a capacitor 521 shunted by a resistor 523. It is connected at one terminal to the output conductor 101 from the sequence timer, the circuit through the network AN14 being completed through rectifier 519 to the conductor AL2. When a signal appears in conductor 101, current flows through resistor 509 and causes thyratron AT4 to conduct and, in addition, network AN14 is charged.

The thyratron AT5 is supplied from another secondary 8AS3 of the transformer AZ3. This secondary 8AS3 is connected between the anode 501 and the cathode 503 of the thyratron AT5 through an anode resistor 531 and a time constant network DN. This network DN includes a capacitor 533 shunted by a variable resistor 535. The control electrode 505 of the thyratron AT5 is connected to the cathode 503 through a grid resistor 536 through the network AN14 and through a ripple network AR. The ripple network AR includes a capacitor 537 shunted by a resistor 539 and the secondary 9AS3 of the transformer AZ3 from which the heater for the cathode 505 is supplied. The secondary 9AS3 produces a ripple in the control circuit of thyratron AT5 through the network AR which assures that when the network AN14 is uncharged or carries a low charge, the thyratron AT5 is rendered conducting at a phase angle of about 1/12 cycle (30°) in its positive half periods of anode-cathode potential. Since the network AN14 when it is charged at all is charged at the beginning of the corresponding positive half periods, the network AR assures that once network AN14 is charged, thyratron AT5 is immediately rendered non-conducting. Thus thyratron AT4 is rendered conducting and thyratron AT5 non-conducting simultaneously.

Thyratron AT6 is supplied from a secondary 10AS3 of the transformer AZ3. The anode 501 and cathode 503 of the thyratron AT6 are connected across the secondary 10AS3 through the primary PC2 of the transformer TC2 and through an anode resistor 541. The control electrode 505 of thyratron AT6 is connected to the cathode 503 through the network DN.

It is seen that the thyratrons AT4 and AT6 control the current conducted by the primaries PC1 and PC2, respectively, and thus the potential output of the transformers TC1 and TC2. If the thyratrons AT4 and AT6 are non-conducting, the transformers TC1 and TC2 do not deliver any potential and the sections of the double triodes DT2 and DT3 are unaffected by the transformers TC1 and TC2.

The sequence timer is the same as that disclosed in an application Serial No. 272,818, filed February 21, 1952, to Clarence B. Stadum, Hubert W. VanNess and Edward C. Hartwig and assigned to the Westinghouse Electric Corporation which I will call the Stadum application. The important component, as far as my invention is concerned, of this sequence timer is the thyratron WT which is rendered conducting at a point in the operation of the timer. The thyratron WT conducts during the weld interval. Its conducting continues until the weld network WN times out and renders the hold thyratron HT conducting.

The thyratron WT includes an anode 259, a cathode 260, a first control electrode 359 and a second control electrode 379. The anode 259 of the thyratron WT is connected to the network AN14 and the cathode 260 to the conductor AL1. When the thyratron WT conducts, the capacitor 521 of network AN14 is thus charged with its plate connected to the anode 259 negative and the plate connected to the control electrode 505 of thyratron AT5 positive. A blocking potential is thus impressed on thyratron AT5 and a potential tending to counteract the potential of bias B7 on thyratron AT4.

The anode 259 of thyratron WT is also connected to the upper terminal of the network AN9 through the conductor 101 and the resistor RI. The lower terminal of this network is connected to the conductor AL2 through the normally open contact 99 of the starting relay SR of the sequence timer. This relay is actuated to close the contact at the beginning of each sequence during the squeeze interval before the thyratron WT is rendered conducting.

Standby

During the standby condition of the apparatus, the circuit breakers or other protective or main switching equipment (not shown) of the apparatus is closed and the conductors L1, L2, AL1 and AL2 and their associated supply transformers TF, AZ1, AZ2 and AZ3 are energized. The cathodes of the thyratrons FT1, FT2 and AT1 through AT6 and of the double triodes DT1, DT2 and DT3 are heated so that these valves are capable of conducting when their control electrodes are properly excited.

During the standby condition of the apparatus, the weld thyratron WT of the sequence timer is nonconducting. The network AN14 is then unchanged and thyratron AT4 is maintained non-conducting by the bias impressed on the network B7. At the beginning of the first positive half period after the circuit breakers or the protective apparatus is closed, thyratron AT5 is rendered conducting. This thyratron immediately charges the capacitor of network DN, maintaining thyratron AT6 non-conducting. Transformers TC1 and TC2 are thus deenergized and supply no potential in the control circuits of the sections of the double triodes DT2 and DT3.

One section 137—135 of double triode DT2 is maintained non-conducting by the biasing network B4. The other section 147—145 is capable of conducting because there is no potential impressed in its control circuit by the secondary TC1. This latter section then assures that the capacitor CR is maintained discharged. The corresponding section 107—105 of the double triode DT1 is then maintained conducting.

One section 147—145 of double triode DT3 is maintained non-conducting by the biasing network B5. The other section 137—135 is maintained conducting in the absence of potential on network AN12 from secondary 1SC2 and the capacitor CD is then charged from this latter section with its upper plate negative and its lower plate positive. The potential thus impressed by the capacitor CD between the control electrode 113 and the cathode 115 of the corresponding section 117—115 of triode DT1 is such as to maintain this section non-conducting.

The conduction of one section of the double triode DT1 produces a potential across the output resistor RO which is impressed as a blocking potential between the control electrodes 67 and the cathodes 65 of the thyratrons AT1 and AT2 on which the potential from the phase shift network DC is superimposed. The magnitude of this blocking potential is determined by the resistor RUS. Thyratron AT3 is maintained non-conducting by the network B3 in the absence of current flow through the resistor RI in series with the network AN9 and thyratrons AT1, AT2 and AT3 cannot conduct.

Since thyratrons AT1, AT2 and AT3 are non-conducting, transformer TF is deenergized and thyratrons FT1 and FT2 are maintained non-conducting by the bias networks B1 and B2, respectively. Ignitrons I-1 and I-2 are then non-conducting and the transformer T is deenergized.

Operation

To carry out a welding operation, the work M is inserted between the electrodes E1 and E2, the relay RWN is actuated by closing switch WNW and a start switch (not shown) in the sequence timer is closed. The sequence timer then passes through certain preliminary timing steps, as disclosed in the Stadum application, actuating relay SR to close its contact and preparing the apparatus otherwise for producing a weld. Thereafter, thyratron WT is rendered conducting. The current flow from this thyratron through resistor RI and the network AN9 impresses a potential across the network AN9 counteracting the bias supplied by network B3. This voltage persists for an interval equal to about one period of the potential impressed from secondary 1AS2. Thyratron AT3 is then conditioned to conduct during this period when thyratrons AT1 or AT2 are rendered conducting. Thyratrons FT1 and FT2 remain non-conducting during each half period so long as thyratrons AT1 and AT2 are non-conducting.

The conduction of thyratrons AT1 and AT2 depends on the current conducted by the conducting section of the double triode DT1 and this, in turn, depends on the setting of the resistor RUS. For certain settings of this resistor, thyratrons AT1 and AT2 may conduct very late in their half periods. Under such circumstances, sufficient current flows through the primary PF very late in each of the half periods of the supply L1—L2 to cause the thyratrons FT1 and FT2 to conduct. The ignitrons I-1 and I-2 then conduct, producing very low current in the primary P of the welding transformer T.

This current is the initial current to flow during the preheat component of the welding pulse and for this reason the resistor RUS is called the preheat start current adjustment.

Also by reason of the conduction of thyratron WT, the network AN14 is charged with the lower terminal connected to the control electrode of thyratron AT5 positive and the other terminal negative. Thyratron AT4 is rendered conducting. In addition, thyratron AT5 is rendered non-conducting, and the supply of current to network DN is discontinued. Network DN then discharges and times out but until network DN times out, thyratron AT6 remains non-conducting.

The conduction of thyratron AT4 causes current to flow through the primary PC1 of the transformer TC1 while transformer TC2 remains quiescent. Potential is then induced in the secondaries 1SC1 and 2SC1. The potential induced in the secondary 1SC1 counteracts the potential impressed by network B4 and the corresponding section 137—135 of double triode DT2 conducts. At the same time the current through secondary 2SC1 builds up a blocking bias on network AN11 and section 147—145 triode DT2 becomes non-conducting. The capacitor CR is then charged with its upper plate negative and its lower plate positive at a rate depending on the setting of the resistor RUT. The conductivity of the corresponding section 107—103 of double triode DT1 is thus reduced at a corresponding rate.

At this time transformer TC2 does not supply potential to networks AN12 and AN13 and the sections 137—135 and 147—145 of triode DT3 remain in their standby conditions and the section 117—115 of triode DT1 remains non-conducting. The potential across the output resistor RO is then reduced in dependence upon the increasing current flow through triode DT2 and the charging of capacitor CR. As this potential is decreased, the thyratrons AT1 and AT2 are rendered conducting earlier and earlier in their positive half periods of anode-cathode potential and firing thyratrons FT1 and FT2 and ignitrons I-1 and I-2 are rendered conducting correspondingly. The primary P of the transformer W is then supplied with current which increases at a rate determined by the rate of decrease of the current flow through the one section 107—105 of the double triode DT1. The current which flows through the material M at this time is the preheat component of the welding current pulse. The manner in which the welding current rises is dependent upon the rise in the charge of capacitor CR and this in turn on the setting of resistor RUT. For this reason resistor RUT is called the preheat time rise adjustment.

A predetermined time interval after the charging of capacitor CR has started, this capacitor reaches a potential at which the current flow through the section 107—105 of the double triode DT1 and the output resistor RO is substantially zero (or a predetermined constant magnitude) and the phase angle in the periods of the supply at which the ignitrons I-1 and I-2 are rendered conducting, is constant. This period of constant current flow through the ignitrons corresponds to the weld component of the pulse and the magnitude of the current now flowing through the primary should be adequate to fuse the material M.

During the preheat and weld components of the welding pulse which has just been described, the network DN has been discharging. At the end of the weld component interval, the network DN has discharged to a potential at which the thyratron AT6 becomes conducting. Thyratron AT6 then conducts impressing a blocking potential on the initially conducting section 137—135 of double triode DT3 through the network AN12 and a potential counteracting the blocking bias of network B5 on the other section 147—145 of the double triode DT3 through the network AN13. The capacitor CD then discharges through the latter section of the double triode DT3, reducing the potential impressed between the control electrode 113 and cathode 115 of the corresponding section 117—115 of double triode DT1 increasing the conduction of this section and increasing the potential drop across the output resistor RO. At the same time the capacitor CR remains charged to the potential to which it was charged during the weld interval and the conduction (if any) of section 107—105 continues unchanged.

The potential between conductors LE1 and LE2 is now increased at the rate depending on the setting of resistor RDT and the thyratrons AT1 and AT2 are rendered conducting later and later in the half periods of the supply. Firing thyratrons FT1 and FT2 and the corresponding ignitrons I-1 and I-2 are then rendered conducting later and later in their corresponding positive half periods of the supply and the welding current is reduced. The rate at which the welding current is reduced is determined by the resistor RDT in series with the capacitor CD and the section of the double triode DT3. This resistor then determines the down slope or the postheat component of the pulse. The manner in which the welding current decays is determined by the discharge of capacitor CD and this in turn on the setting of resistor RDT. For this reason resistor RDT is called the postheat time decay adjustment.

The decrease of the current flow through the primary P continues until the capacitor CD is discharged to a predetermined potential. Thereafter, the current flow through the corresponding section of the double triode DT1 becomes substantially constant, as determined by the resistor RDF. At this point, the ignitrons are rendered conducting very late in their half periods or remain entirely non-conducting. This resistor RDF determines the final current of the postheat component of the pulse and is called postheat final current adjustment.

At the end of the weld interval, as determined by the weld network NW of the sequence timer, the hold thyratron HT of the sequence timer is rendered conducting, rendering the weld thyratron WT non-conducting. The charging of network AN9 is stopped and thyratrons AT3 and AT1 and AT2 become non-conducting so that the ignitrons I-1 and I-2 cease to conduct and the flow of welding current stops. The charging of the network AN14 is also interrupted and the network discharges in a time interval of the order of one period of the supply, permitting thyratron AT5 to become conducting and rendering thyratron AT4 non-conducting. The conduction of thyratron AT5 immediately charges network DN to render thyratron AT6 non-conducting. The supply of potential through the transformers TC1 and TC2 is then interrupted. The section 137—135 of double triode DT2 which has been conducting is rendered non-conducting and the other section 147—145 is rendered conducting to discharge the capacitor CR. The capacitor is discharged in a short time interval causing the corresponding section of the double triode DT1 to conduct and to reset the blocking potential on the thyratrons AT1 and AT2 through the conductors LE1 and LE2; this does not affect the thyratrons because they are already non-conducting. In addition, the section 147—145 of double triode DT3, which has been conducting, is rendered non-conducting, and the other section 137—135 of the double triode DT3 is rendered conducting. The discharge circuit is thus disconnected from the capacitor CD and the capacitor is charged to block the corresponding section 117—115 of the double triode DT1. The apparatus is now reset for another welding operation.

The operation of the apparatus is illustrated in Fig. 2. In this figure, voltage is plotted vertically and time horizontally. The heavy sine wave curve along the time axis corresponds to the potential impressed on the ignitions I-1 and I-2. The medium weight curve corresponds to the potential impressed by the phase variation unit across the conductors LE1 and LE2. It is seen that this potential rises from a substantial negative value to a small negative value and then decays to the high negative value as the charge on capacitors CR and CD varies. On this curve, a sine wave curve of medium weight which corresponds to the potential derived from the phase shift network PS is superimposed. This superimposed curve represents the net potential impressed between the control electrode 67 and the cathode 65 of the thyratron AT1. A similar superimposed curve with the loops corresponding to half cycles would represent the net potential impressed between the control electrode 67 and the cathode 65 by thyratron AT2.

For convenience, it is assumed that the thyratrons AT1 and AT2 are rendered conducting respectively when the corresponding curve intersects the time axis. It is seen from Fig. 2 that the thyratron AT1 (and, therefore, ignitron I–1) is fired earlier and earlier in its positive half periods of the supply as the potential impressed at the output of the phase variation unit increases and then later and later in its half periods as the phase variation potential decreases. The corresponding curve for thyratron AT2 would present precisely the same condition. The preheat, weld and postheat intervals to which Fig. 2 corresponds are labeled on the graph as are also the preheat start current setting and the postheat final current setting. It is noted that in the case illustrated, both the preheat start current and the postheat final current are zero.

Conclusion

The apparatus described above is capable of producing welding pulses having preheat and postheat components of any reasonable magnitudes. This apparatus is of simple and low cost structure in spite of its flexibility. It is, therefore, highly useful particularly for the welding of metals which require careful adjustment of the preheat and postheat components.

While I have shown and described a certain specific embodiment of my invention, many modifications thereof are possible. My invention, therefore, is not to be limited except insofar as is necessitated by the spirit of the prior art.

I claim as my invention:

1. In combination, a first electric discharge path defined by an anode and a cathode and having a control electrode, a second electric discharge path defined by an anode and a cathode and having a control electrode, means for connecting said anodes and cathodes in parallel, a first capacitor connected between the control electrode and the cathode of said first path, a second capacitor connected between the control electrode and the cathode of said second path, means connected to said first capacitor for normally discharging said first capacitor, means connected to said second capacitor for normally charging said second capacitor to a potential tending to decrease the conductivity of said second path, signal receiving means, first means connected to said receiving means and to said first capacitor responsive to a signal received by said receiving means for interrupting the discharging and initiating and maintaining the charging of said first capacitor to a potential tending to decrease the conductivity of said first path, and second means connected to said receiving means and to said second capacitor responsive to said signal and operative a predetermined time interval after the receiving of said signal for interrupting the charging and initiating and maintaining the discharging of said second capacitor.

2. Welding apparatus to be energized from an alternating-current supply and including main electric discharge means for supplying the welding current and means connected to said main discharge means and responsive to the magnitude of a heat-control potential for rendering said discharge means conducting at predetermined instants, as determined by said magnitude, in the half periods of said supply; the said apparatus being characterized by the fact that said heat-control potential is derived from a circuit including a first capacitor, a second capacitor, means for charging the said capacitors each to a predetermined potential, means connected to said capacitors and responsive to potential on said capacitors for determining the magnitude of said heat-control potential, the said connected means increasing said potential as the charge on one of said capacitors varies and decreasing said potential as the charge on the other of said capacitors varies, first means connected to said first capacitor for varying the potential on said first capacitor, second means connected to said second capacitor for varying the potential on said second capacitor, and means interconnecting said first and second means permitting variation of the potential on only one capacitor at a time.

3. Welding apparatus to be energized from an alternating-current supply and including main electric discharge means for supplying the welding current and means connected to said main discharge means and responsive to the magnitude of a heat-control potential for rendering said discharge means conducting at predetermined instants, as determined by said magnitude, in the half periods of said supply; the said apparatus being characterized by the fact that said heat-control potential is derived from a circuit including a first capacitor, a second capacitor, means for charging the said capacitors each to a predetermined potential, means connected to said capacitors and responsive to potential on said capacitors for determining the magnitude of said heat-control potential, the said connected means increasing said potential as the charge on one of said capacitors varies and decreasing said potential as the charge on the other of said capacitors varies, first means connected to said first capacitor for changing the charge on said first capacitor in one sense, and second means connected to said first means to cooperate therewith in timed relationship for changing the charge on said second capacitor in the opposite sense a predetermined interval after the charge on said first capacitor has been charged in said one sense.

4. Welding apparatus to be energized from an alternating-current supply and including main electric discharge means for supplying the welding current and means connected to said main discharge means and responsive to the magnitude of a heat-control potential for rendering said discharge means conducting at predetermined instants, as determined by said magnitude, in the half periods of said supply; the said apparatus being characterized by a first capacitor, a second capacitor, means for charging the said capacitors each to a predetermined potential, a first electric discharge path having an anode and a cathode and including a control electrode, a second electric discharge path having an anode and a cathode and including a control electrode, means connecting said first capacitor between said control electrode and cathode of said first path, means connecting said second capacitor between said control electrode and cathode of said second path, means connected to said anodes and cathodes of said paths and to said magnitude responsive means for deriving said heat control potential, first means connected to said first capacitor for changing the charge on said first capacitor in one sense, and second means connected to said first means to cooperate therewith in timed relationship for changing the charge on said second capacitor in the opposite sense a predetermined interval after the charge on said first capacitor has been charged in said one sense.

5. Welding apparatus to be energized from an alternating-current supply and including main electric discharge means for supplying the welding current and means connected to said main discharge means and responsive to the magnitude of a heat-control potential for rendering said discharge means conducting at predetermined instants, as determined by said magnitude, in the half periods of said supply; the said apparatus being characterized by a first capacitor, a second capacitor, means for charging the said capacitors each to a predetermined potential, a first electric discharge path having an anode and a cathode and including a control electrode, a second electric discharge path having an anode and a cathode and including a control electrode, means connecting said first capacitor between said control electrode and cathode of said first path, means connecting said second capacitor between said control electrode and cathode of said second path, a resistor, means connecting said resistor to said anodes and cathodes of both said paths with said anodes and cathodes poled to conduct current of the same polarity through said resistor, and means connected to said resistor and to said magnitude responsive means for deriving said heat control potential, first means connected to said first capacitor for changing the charge on said first capacitor in one sense, and second means connected to said first means to cooperate therewith in timed relationship for changing the charge on said second capacitor in the opposite sense a predetermined interval after the charge on said first capacitor has been charged in said one sense.

6. In combination, a first electric discharge path defined by an anode and a cathode and having a control electrode, a second electric discharge path defined by an anode and a cathode and having a control electrode, means for connecting said anodes and cathodes in parallel, a first capacitor connected between the control electrode and said cathode of said first path, a second capacitor connected between the control electrode and said cathode of said second path, means connected to said first capacitor for normally discharging said first capacitor, means connected to said second capacitor for normally charging said second capacitor to a potential tending to decrease the conductivity of said second path, signal receiving means, first means connected to said receiving means and to said first capacitor responsive to a signal received by said receiving means for interrupting the discharging and initiating and maintaining the charging of said first capacitor to a potential tending to decrease the conductivity of said first path, a third electric discharge path defined by an anode and a cathode, a time constant network, power supply means, means for connecting in series said time constant network, said power supply means, said anode and said cathode of said third path, a fourth electric discharge path defined by an anode and a cathode and having a control electrode, means for connecting said time constant network to said last-named control electrode in such a sense that when said third path is conducting said network is charged to block said fourth path and when said third path is non-conducting said fourth path is permitted to conduct a predetermined time interval after the conduction of said third path is interrupted, means for normally maintaining said third path conducting, means connected to said third path and said receiving means and responsive to said signal for rendering said third path non-conducting and means for coupling said fourth path and said second capacitor for interrupting the charging of the second capacitor and for starting and maintaining the discharging of said second capacitor when said fourth path is rendered conducting.

7. In combination, a first electric discharge path defined by an anode and a cathode and having a control electrode, a second electric discharge path defined by an anode and a cathode and having a control electrode, means for connecting said anodes and cathodes in parallel, a first capacitor connected between the control electrode and the cathode of said first path, a second capacitor connected between the control electrode and the cathode of said second path, a third electric discharge path having an anode and a cathode and including a control electrode, means connecting said anode and cathode of said third path to said first capacitor for normally discharging said first capacitor, a fourth electric discharge path having an anode and a cathode and including a control electrode, means connecting said anode and cathode of said fourth path to said second capacitor for normally charging said second capacitor to a potential tending to decrease the conductivity of said second path, signal receiving means, a fifth electric discharge path having an anode and a cathode and including a control electrode; means connecting said anode and cathode of said fifth path in charging relationship to said capacitor, means connected to said control electrodes of said third and fifth paths responsive to a signal received by said receiving means for interrupting the discharging and initiating and maintaining the charging of said first capacitor to a potential tending to decrease the conductivity of said first path, a sixth electric discharge path defined by an anode and a cathode, a time constant network, power supply means, means for connecting in series said time constant network, said power supply means, said anode and said cathode of said sixth path, a seventh electric discharge path defined by an anode and a cathode and having a control electrode, means for connecting said time constant network to said last-named control electrode in such a sense that when said sixth path is conducting said network is charged to block said seventh path and when said sixth path is non-conducting said seventh path is permitted to conduct a predetermined time interval after the conduction of said sixth path is interrupted, means for normally maintaining said sixth path conducting, means connected to said sixth path and said receiving means and responsive to said signal for rendering said sixth path non-conducting, an eighth electric discharge path having an anode and a cathode and including a control electrode, means connecting said anode and cathode of said eighth path in discharging relationship with said secured capacitor and means for coupling said seventh path and said second capacitor connected to said control electrodes of said fourth and eighth paths for interrupting the charging of the second capacitor and for starting and maintaining the discharging of said second capacitor when said seventh path is rendered conducting.

8. In combination, a first electric discharge path defined by an anode and a cathode and having a control electrode, a second electric discharge path defined by an anode and a cathode and having a control electrode, means for connecting said anodes and cathodes in parallel, a first capacitor connected between the control electrode and the cathode of said first path, a second capacitor connected between the control electrode and the cathode of said second path, a third electric discharge path having an anode and a cathode and including a control electrode, means connecting said anode and cathode of said third path in discharging relationship to said first capacitor, means connected to said control electrode of said third path for normally maintaining said third path conducting for normally discharging said first capacitor, a fourth electric discharge path having an anode and a cathode and including a control electrode, means connecting said anode and cathode of said fourth path in charging relationship to said second capacitor, means connected to said control electrode of said fourth path for normally maintaining said fourth path conducting for normally charging said second capacitor to a potential tending to decrease the conductivity of said second path, signal receiving means, a fifth electric discharge path having an anode and a cathode and including a control electrode, means connecting said anode and cathode of said fifth path in charging relationship to said first capacitor, means connected to said control electrode of said fifth path for normally maintaining said fifth path non-conducting, means connected to said control electrodes of said third and fifth paths and responsive to a signal received by said receiving means for rendering said third path non-conducting and said fifth path conducting for interrupting the discharging and initiating and maintaining the charging of said first capacitor to a potential tending to decrease the conductivity of said first path, a sixth electric discharge path having an anode and a cathode and including a control electrode, means connecting said anode and cathode of said sixth path in discharging relationship to said second capacitor, means connected to said control electrode of said sixth path for normally maintaining said sixth path non-conducting, and means connected to said control electrodes of said fourth and sixth paths and responsive to said signal and operative a predetermined time interval after the receiving of said signal for rendering said fourth path non-conducting and said sixth path conducting for interrupting the charging and initiating and maintaining the discharging of said second capacitor.

References Cited in the file of this patent

UNITED STATES PATENTS

| | | |
|---|---|---|
| 2,122,464 | Golay | July 5, 1938 |
| 2,179,105 | Sidney | Nov. 7, 1939 |
| 2,435,841 | Morton et al. | Feb. 10, 1948 |
| 2,516,348 | Serota | July 25, 1950 |
| 2,583,792 | Nelson | Jan. 29, 1952 |